(12) United States Patent
Arnaud D'Avitaya et al.

(10) Patent No.: US 9,468,920 B2
(45) Date of Patent: Oct. 18, 2016

(54) ULTRA-POROUS PHOTOCATALYTIC MATERIAL, METHOD FOR THE MANUFACTURE AND THE USES THEREOF

(75) Inventors: François Arnaud D'Avitaya, Marseilles (FR); Viatcheslav Safarov, L'Hay les Roses (FR); Nadzeya Alexandrovna Zalatarevich, Minsk (BY)

(73) Assignees: Aix-Marseille Universite, Marseilles (FR); Faldes, Rousset (FR)

( * ) Notice: Subject to any disclaimer, the term of this patent is extended or adjusted under 35 U.S.C. 154(b) by 1150 days.

(21) Appl. No.: 13/498,002

(22) PCT Filed: Sep. 22, 2010

(86) PCT No.: PCT/FR2010/000634
§ 371 (c)(1),
(2), (4) Date: Jul. 12, 2012

(87) PCT Pub. No.: WO2011/036353
PCT Pub. Date: Mar. 31, 2011

(65) Prior Publication Data
US 2012/0270722 A1    Oct. 25, 2012

(30) Foreign Application Priority Data
Sep. 25, 2009 (FR) ..................... 09 04588

(51) Int. Cl.
| | | |
|---|---|---|
| *B01J 23/28* | (2006.01) | |
| *B01J 23/30* | (2006.01) | |
| *B01J 35/00* | (2006.01) | |
| *B01J 35/10* | (2006.01) | |
| *B01J 37/00* | (2006.01) | |
| *C01B 3/04* | (2006.01) | |
| *C01B 13/02* | (2006.01) | |
| *B01J 21/06* | (2006.01) | |
| *B01J 23/26* | (2006.01) | |

(52) U.S. Cl.
CPC ............... *B01J 35/004* (2013.01); *B01J 35/10* (2013.01); *B01J 35/1023* (2013.01); *B01J 35/1028* (2013.01); *B01J 35/1061* (2013.01); *B01J 37/0018* (2013.01); *C01B 3/042* (2013.01); *C01B 13/0207* (2013.01); *B01J 21/063* (2013.01); *B01J 23/26* (2013.01); *B01J 23/28* (2013.01); *B01J 23/30* (2013.01); *Y02E 60/364* (2013.01)

(58) Field of Classification Search
None
See application file for complete search history.

(56) References Cited

FOREIGN PATENT DOCUMENTS

| | | | | |
|---|---|---|---|---|
| JP | 2003135972 A | * | 5/2003 | ............... B01J 35/02 |
| JP | 2005 222782 A | | 8/2005 | |
| WO | WO 03/092886 A1 | * | 11/2003 | ............... B01J 21/06 |

OTHER PUBLICATIONS

Lazarouk et al (Nanoporous Oxides of Refractory Metals: Fabrication and Properties, Phys Stat Sol. (C) 2008, 5(12), pp. 3690-3693).*

Zhang et al (Recent advances of superhard nanocomposite coatings: a review, Surf Coat Tech, 167 (2003) 113-119).*

(Continued)

*Primary Examiner* — Melvin C Mayes
*Assistant Examiner* — Michael Forrest
(74) *Attorney, Agent, or Firm* — Alston & Bird LLP

(57) ABSTRACT

The present invention relates to a method for manufacturing ultra-porous photocatalytic materials, to the ultra-porous photocatalytic materials obtained by such a method, as well as to the uses thereof for producing hydrogen, treating wastewater and polluted water, treating polluted air, or furthermore to the use of same as catalytic membranes in fuel cells. Finally, a last aim of the invention relates to articles chosen among hydrogen production devices, self-cleaning glass panes and antipollution walls.

21 Claims, 1 Drawing Sheet

(56) References Cited

OTHER PUBLICATIONS

Aerts et al(Influence of the anodizing temperature on the porosity and mechanical properties of the porous anodic oxide film, Surf Coat Tech., 201 (2007)7310-7317).*
Zhang et al(Crystallization behaviors of TiO2 films derived from thermal oxidation of evaporated and sputtered titanium films, J Alloys and Compounds 480 (2009) 938-941).*
International Search Report/Written Opinion for Application No. PCT/FR2010/000634 dated Feb. 14, 2011.
Lazarouk, S. K. et al., *Nanoporous Oxides of Refractory Metals; Fabrication and Properties*, Phys. Stat. Sol.(c)5, No. 12, (2008) 3690-3693.
Park, J. et al., *Nanosize and Vitality: TiO$_2$ Nanotube Diameter Directs Cell Fate*, Nano Letters, vol. 7, No. 6, (2007) 1686-1691.
Srivastava et al., International Journal of Hydrogen Energy, vol. 25 (2000) 495-503.

* cited by examiner

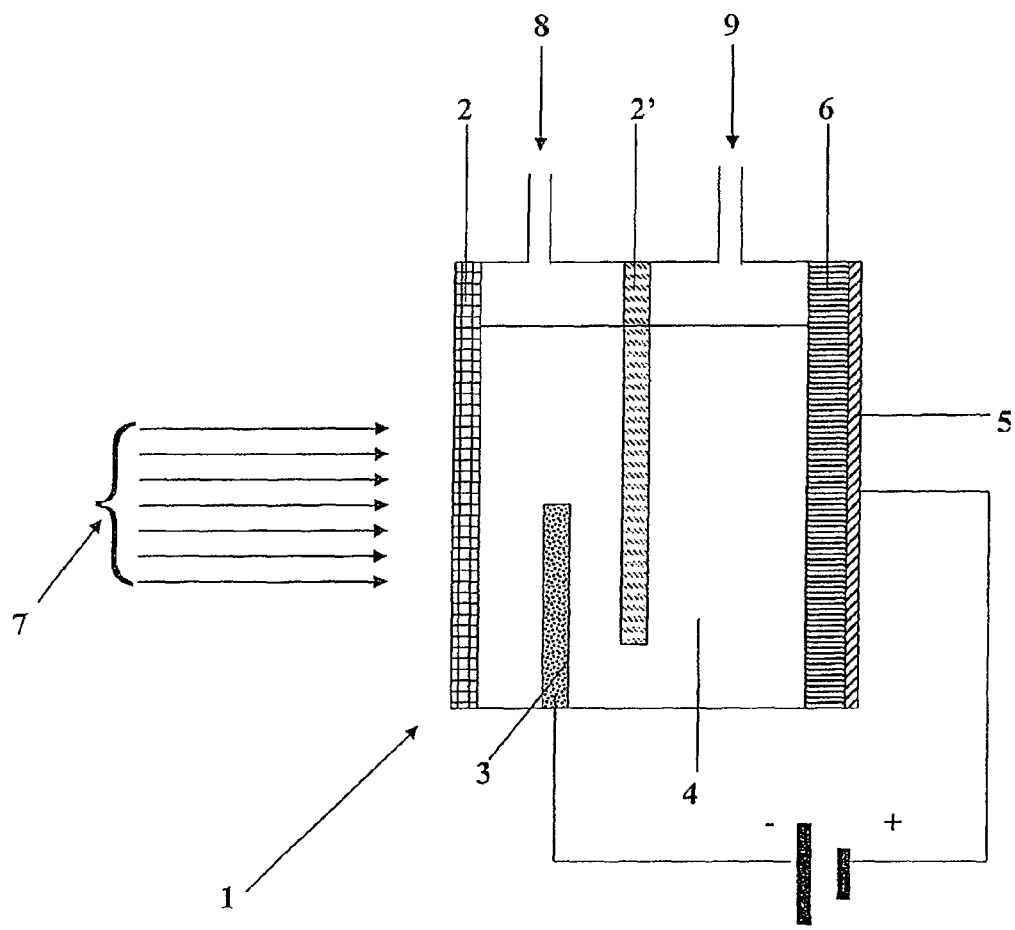

ULTRA-POROUS PHOTOCATALYTIC MATERIAL, METHOD FOR THE MANUFACTURE AND THE USES THEREOF

FIELD OF THE INVENTION

The present invention relates to a process for the manufacture of ultraporous photocatalytic materials, to the ultraporous photocatalytic materials obtained according to such a process and to their uses in producing hydrogen, treating waste water and contaminated water, or treating contaminated air, or also to their use as catalytic membranes in fuel cells. Finally, a final subject matter of the invention is articles chosen from devices for the production of hydrogen, self-cleaning windows and pollution-resistant walls.

BACKGROUND OF THE INVENTION

Photocatalysis is a natural electronic process brought about by the absorption of UV or visible radiation at the surface of a substance, referred to as photocatalyst. By using light energy, the photocatalysts bring about the formation of free radicals capable of decomposing, by oxidation/reduction, certain organic or inorganic substances present in the medium in which they are immersed. Thus, the main advantage of photocatalysis lies in the fact that the energy necessary for the oxidation/reduction reactions is supplied by direct absorption of light, rather than by thermal heating.

The photocatalysts used are semiconducting materials having a forbidden band (optical gap), typically of between 3 and 4 eV, corresponding to irradiation with light in the spectral region of the near UV. The absorption of photons with an energy greater than the optical gap results in the formation of electron-hole pairs within the semiconductor, it being possible for these charge carriers subsequently either to recombine according to various mechanisms or to diffuse to the surface of the semiconductor.

Thus, the photocatalytic reaction which takes place at the surface of a semiconducting material comprises several stages,
- the adsorption of the reactants at the surface of the photocatalyst,
- the formation of electron-hole pairs by absorption of photons resulting from irradiation with UV,
- the separation of the electron-hole pairs and their migration to the surface of the photocatalyst,
- oxidation and reduction reactions of the electrons and holes with other adsorbed entities, such as pollutants, pollen, bacteria or viruses, resulting in the decomposition of these entities, and
- the desorption of the reaction products.

The rate at which the photocatalysis reactions take place depends on the light intensity, on the amount of photocatalyst (number and lifetime of the charge carriers) and on the duration of the contact between the semiconductor and the materials present in the medium in which they are immersed.

The most commonly used photocatalysts are wide-gap semiconductors based on oxides or sulfur, such as $TiO_2$, $ZnO$, $CeO_2$, $ZrO_2$, $SnO_2$, $CdS$ or $ZnS$, the most widely used photocatalyst being titanium dioxide ($TiO_2$) due to its thermodynamic stability, its absence of toxicity and its low cost.

Thus, the active oxygen originating from the photocatalytic reaction is capable of decomposing and destroying:
- volatile organic compounds (VOCs),
- NOx gases escaping from vehicles and factories,
- bacteria, viruses, microbes,
- molds, algae, fungi,
- allergens, such as pollen and acarids,
- human, animal and chemical odors.

Photocatalysis is thus used in the field of water treatment, air treatment and deodorizing but also as antibacterial agent. Photocatalysis may also find applications in the medical field for combating infected cells.

In industry, the principle of photocatalysis is also employed in the use of self-cleaning glass, this application being associated with a second property of the irradiated semiconductor: superhydrophilicity. Because of its special microscopic coating, a self-cleaning glass has the ability to decompose organic contaminants and thus to remain clean longer than an ordinary glass. The process for the manufacture of self-cleaning glasses comprises a stage of application, to its external face, of a special photocatalytic layer based on titanium dioxide ($TiO_2$). The self-cleaning function of these glasses is based on the union of two properties of the microscopic layers deposited: photocatalysis and superhydrophilicity. This is because the hydrophilic properties of this glass mean that the water falling on the glass sheet washes the glass, instead of leaving it dirty, like an ordinary glass. Instead of falling as drops on the glass, the water gradually forms a film which, by gravity, ends up by sliding along the glass while washing it. Thus, self-cleaning glasses make possible a reduction in the cleaning costs but also in the environmental impacts as they require a reduced use of detergents.

Current photocatalytic materials are mainly manufactured according to expensive sol-gel processes requiring the use of precursors (Srivastava et al., International Journal of Hydrogen Energy, Vol. 25, pp. 495-503, 2000).

Photocatalysts of high porosity have been prepared from composite materials composed of titanium and aluminum, the composite material deposited being subjected to an electrochemical anodization, the aluminum oxide formed subsequently being removed by attacking with a solution of strong acid $H_3PO_4$ (5%) and $CrO_3$ (2%) at a temperature of 80° C., the use of concentrated acid baths being very problematic to handle (Phys. Stat. Sol., No. 12, 3690-3693 (2008)). Furthermore, the deposition and thermal annealing temperatures employed in this process do not make it possible to achieve a satisfactory photocatalytic activity.

Another disadvantage of the known methods of the state of the art results from the low porosity and the low specific surface of the photocatalysts obtained, the latter in fact exhibiting an insufficient effectiveness, the photocatalytic efficiencies of these materials being between 0.5 and 3%.

Thus, the technical problem remaining to be solved, with respect to this state of the art, consists of the development of a photocatalyst which has an improved photocatalytic activity, which has excellent adhesion to the substrate and which can be applied as thick layers. This photocatalyst should also be able to be employed according to processes which are simple and economic and which are highly feasible industrially.

SUMMARY OF THE INVENTION

The ultraporous photocatalytic materials of the invention propose to overcome all these disadvantages by meeting the following needs and requirements:
- an excellent photocatalytic activity, the reactions which they catalyze exhibiting efficiencies which can be up to 10 times greater than those obtained with conventional photocatalysts, a very good adhesion to the substrates on which they are applied, as a result of the absence of mechanical stresses at the substrate/refractory metal interface, the absence of such mechanical stresses also making possible the application of very thick layers which can range up to 100 µm in thickness, a simplified and relatively inexpensive manufacture, and a satisfactory industrial feasibility (large scale production).

In order to ensure an optimum photocatalytic activity, the photocatalytic materials of the invention should exhibit the following characteristics:

a very high porosity, necessary in order to obtain a high specific surface, pores having thin walls, so that all the charge carriers generated can reach, before recombining, the depletion region where they will be separated, a sufficiently great thickness for all the photons having an energy greater than the gap of the semiconductor to be completely absorbed.

Thus, the first subject matter of the invention is a process for the manufacture of an ultraporous photocatalytic material employing a composite material composed of at least one refractory metal and at least one nonrefractory filler metal.

The ultraporous photocatalytic material obtained according to the process of the invention, exhibiting pores having very thin walls, also constitute a subject matter of the present invention.

Additional subject matters relate to the various uses of the ultraporous photocatalytic material of the invention.

Finally, articles composed of ultraporous photocatalytic materials such as those of the invention also come within the invention.

BRIEF DESCRIPTION OF THE DRAWINGS

FIG. 1 illustrates a device for the production of hydrogen comprising a layer of photocatalytic material according to the invention.

DETAILED DESCRIPTION OF THE INVENTION

The first subject matter of the present invention is a process for the manufacture of an ultraporous photocatalytic material, comprising:

a stage of deposition on a substrate, at a temperature of between 50 and 250° C., preferably of between 50 and 150° C. and more preferably still of between 80 and 120° C., of a composite material composed of at least one refractory metal and of at least one nonrefractory filler metal, a subsequent stage of removal of the nonrefractory filler metal, said process also comprising a final stage of thermal annealing at a temperature greater than or equal to 600° C., preferably greater than or equal to 650° C., and also an oxidation stage which can be carried out either before or after the stage of removal of the nonrefractory filler metal or simultaneously with the final stage of thermal annealing.

The duration of the final stage of thermal annealing can be between 5 and 30 minutes and preferably between 10 and 15 minutes.

Within the meaning of the present invention, refractory metal is understood to mean a metal for which the oxide is a semiconductor, and nonrefractory filler metal is understood to mean a metal for which the oxide is an insulator. More specifically, the refractory metal oxide is an oxide for which the separation between the valence band and the conduction band (or forbidden band, also known as optical gap) is greater than 2.5 eV, the following two conditions having to be met:

the top of the valence band is at an energy lower than the HOMO (Highest Occupied Molecular Orbital) level of the molecule to be dissociated, and the bottom of the conduction band is at an energy greater than the LUMO (Lowest Unoccupied Molecular Orbital) level of the molecule to be dissociated.

The oxidation may be a thermal, chemical or electrochemical oxidation stage.

The nonrefractory filler metal is removed by selective chemical attack, so as not to detrimentally affect the refractory metal. This stage consists in bringing the substrate, covered with the composite material, into contact with an acidic or basic solution preferably chosen from solutions of phosphoric acid ($H_3PO_4$), sodium carbonate ($NaCO_3$), potassium hydroxide (KOH) and sodium hydroxide (NaOH). When the oxidation stage is carried out after the removal of the nonrefractory filler metal, it would be preferable to use:

to remove a nonrefractory filler metal based on aluminum: a solution of phosphoric acid ($H_3PO_4$) or potassium hydroxide (KOH), to remove a nonrefractory filler metal based on silicon: a solution of potassium hydroxide (KOH) or sodium hydroxide (NaOH).

The duration of the stage of removal by selective chemical attack will depend on the thickness of the composite material to be attacked. For layers having a thickness of between 2 and 5 µm, the duration of the removal stage will preferably be less than 2 minutes.

The stage of removal by selective chemical attack is considered to be complete once the nonrefractory filler metal is present only in the form of traces in the composite material, that is to say at a content by weight of less than 1%. A modification to the surface appearance of the composite material is then observed (change in color of the material).

According to a preferred embodiment, the process of the invention can comprise the following stages:

(i) a deposition on a substrate, at a temperature of between 50 and 250° C., of a composite material composed of at least one refractory metal and of at least one nonrefractory filler metal, (ii) an oxidation of the composite material, resulting in the formation of a mixture of grains of refractory metal oxides and of nonrefractory filler metal oxides, (iii) a removal by selective chemical attack of the nonrefractory filler metal oxide obtained during stage (ii), (iv) a thermal annealing at a temperature greater than or equal to 600° C., preferably greater than or equal to 650° C., this annealing stage making it possible to recrystallize the refractory metal oxides.

In this specific embodiment, the oxidation stage (ii) is preferably an electrochemical oxidation stage.

The electrochemical oxidation stage consists of an electrochemical anodization of the composite material, said material being first of all dipped in an acidic aqueous solution at a concentration of between 0.1 and 3 $mol.l^{-1}$ and preferably at a concentration of between 0.1 and 2 $mol.l^{-1}$. The acidic aqueous solution used can be a sulfuric acid ($H_2SO_4$) solution or an oxalic acid (HOOC-COOH) solution or a phosphoric acid ($H_3PO_4$) solution, the phosphoric acid ($H_3PO_4$) solution being the most preferred. A current density of between 1 and 15 mA.cm$^{-2}$ and preferably of between 1 and 10 mA.cm$^{-2}$ is subsequently applied to the material until a potential of between 70 and 250 V (the value of the potential will depend on the concentration of the acidic aqueous solution) is achieved. The current density is then maintained for a period of time of between 1 and 60 minutes, depending on the oxide thickness desired. The electrochemical oxidation stage can advantageously be carried out at a temperature of between 40 and 70° C.

According to another embodiment, the process of the invention can comprise the following stages:
(i') a deposition on a substrate, at a temperature of between 50 and 250° C., of a composite material composed of at least one refractory metal and of at least one nonrefractory filler metal,
(ii') a removal by selective chemical attack of the nonrefractory filler metal obtained during stage (i'),
(iii') an oxidizing chemical treatment or a heat treatment under an oxidizing atmosphere,
(iv') a thermal annealing at a temperature greater than or equal to 600° C., preferably greater than or equal to 650° C., this annealing stage making it possible to recrystallize the refractory metal oxides.

In this specific embodiment, the stage (iii') of oxidizing chemical treatment or heat treatment under an oxidizing atmosphere can be:
either a stage of chemical oxidation, preferably carried out in an oxidizing bath based on $H_2SO_4/H_2O_2$ or $HCl/H_2O_2$,
or a stage of thermal oxidation, preferably carried out at a temperature of between 400 and 500° C., the temperature of stage (iii') having to be lower than the temperature of the stage (iv') of thermal annealing. The oxidizing atmosphere can be created by introduction of molecular oxygen $O_2$ at a pressure between 100 mbar and 1 bar. The duration of stage (iii') is advantageously between 10 and 60 minutes and preferably between 10 and 30 minutes.

According to yet another embodiment, the process of the invention can comprise the following stages:
(i") a deposition on a substrate, at a temperature of between 50 and 250° C., of a composite material composed of at least one refractory metal and at least one nonrefractory filler metal,
(ii") a removal by selective chemical attack of the nonrefractory filler metal obtained during stage (i"),
(iv") a thermal annealing under an oxidizing atmosphere, preferably at atmospheric pressure, at a temperature greater than or equal to 600° C. and preferably greater than or equal to 650° C., this annealing stage making it possible to recrystallize the refractory metal oxides.

In this specific embodiment, the oxidizing atmosphere of stage (iv") can be created by introduction of molecular oxygen $O_2$ at atmospheric pressure. The duration of stage (iv") is advantageously between 10 and 60 minutes and preferably between 15 and 30 minutes.

The composite material employed during the deposition stage can comprise a refractory metal chosen from titanium, tungsten, niobium, molybdenum and their mixtures and a nonrefractory filler metal chosen from aluminum, silicon and their mixture, it being possible for the nonrefractory filler metal optionally to be mixed with chromium, tantalum, vanadium or rhenium. The mixtures of refractory metals can comprise the following metal pairs: titanium/tungsten, titanium/niobium and tungsten/niobium. Preferably, the composite material of the invention is composed of a refractory metal chosen from titanium or the titanium/tungsten mixture and of aluminum as nonrefractory filler metal.

The atomic percentage of refractory metal in the composite material can be between 20 and 70% and preferably between 40 and 60%. If this percentage is too low, a porous film is obtained which exhibits a weak mechanical performance and, if it is too high, the porous structure of the material is not formed (the nonrefractory filler metal is not etched into the material). It should be noted that the greater the proportion of filler metal in the composite material, the greater the final porosity of the photocatalytic material. Thus, it is the proportion of the nonrefractory filler metal which defines the final morphology of the photocatalyst.

The substrate on which the composite material is deposited is preferably chosen from glass, metal, preferably aluminum or sheets of titanium, polymers, ceramics and semiconducting materials. The polymers used have to be stable at the temperature greater than or equal to 600° C.; they can in particular be silicones. It should be noted that, in the case of an electrochemical oxidation, the insulating substrates will have to have been treated beforehand, for example by application of an ITO (Indium Tin Oxide) layer, so as to render them conducting.

According to a particularly advantageous embodiment, the stage of deposition of the composite material is carried out at a temperature of between 50 and 150° C. and more preferably still between 80 and 120° C. Preferably, the deposition stage is carried out by cathode sputtering, thermal evaporation or electrolytic deposition. At this temperature, the diffusion between the refractory metal oxide and the oxide of the nonrefractory filler metal is too low, the bonding coefficients of the two entities being regarded as unitary. A diffusion barrier is then formed at the interface of the two metal oxides, which makes possible selective attack on the nonrefractory filler metals, resulting in an extremely high porosity of the photocatalytic materials. An excessively low deposition temperature, in particular one lower than 50° C., results in insufficient adhesion of the material to substrate, whereas an excessively high temperature results in sizes of pores and in a thickness of the size of the pores which are excessively high.

Another subject matter of the present invention relates to an ultraporous photocatalytic material based on at least one refractory metal oxide obtained by the process of the invention, said photocatalytic material comprising pores for which the walls have a thickness of less than or equal to 10 nm and preferably of between 1 and 7 nm.

The mean diameter of the pores is preferably between 10 and 60 nm.

The diameter of the pores and the thickness of the walls of the pores are measured according to techniques well known to a person skilled in the art, such as, for example, by scanning microscopy or by transmission microscopy.

Preferably, the refractory metal oxide constituting the photocatalytic material of the invention comprises at least one refractory metal oxide chosen from titanium oxide, tungsten oxide, niobium oxide, molybdenum oxide and their mixtures. The refractory metal oxide can also be a mixed oxide chosen from titanium/tungsten, titanium/niobium and tungsten/niobium oxides.

The composite material of the invention can also comprise a dopant chosen from copper, iron, carbon and transition metals, such as cobalt, nickel or zinc. These materials create electron levels in the forbidden band of the refractory metal oxide, it then being possible for the photons of lowest energy (less than 3 eV) to be absorbed and to participate in the formation of the electron-hole pairs necessary for the photocatalytic process. Thus, the doped material obtained can then absorb a greater portion of a solar spectrum.

The photocatalytic material of the invention advantageously exhibits a porosity of between 50 and 95%. The specific surface of said composite material can, for its part, be between 500 and 700 $m^2.cm^{-3}$ and preferably between 600 and 700 $m^2.cm^{-3}$. The porosity and the specific surface can be determined by BET or by weighing or by absorption isotherm.

The high porosity of the photocatalytic materials obtained is explained by the absence of demixing between the refractory metal oxide and the oxide of the nonrefractory filler metal, the selective attack on the oxide of the nonrefractory filler metal resulting in an ultraporous material, the size of the pores of which is nanometric, and exhibiting a high specific surface.

The absence of mechanical stresses at the substrate/photocatalyst interface makes possible the manufacture of layers of oxides which are very thick. Thus, the thickness of the photocatalytic material of the invention can advantageously be greater than 2 µm, preferably greater than 5 µm and more preferably between 8 and 100 µm, without the layer of oxides being partially or completely destroyed.

Another subject matter of the invention relates to the various uses of the photocatalytic material of the invention. Its uses are as follows:
  the production of hydrogen,
  the treatment of waste water and polluted water,
  the treatment of polluted air,
  the manufacture of self-cleaning windows.

The photocatalytic material of the invention can also be used as catalytic membrane for fuel cells.

Finally, the final subject matter of the present invention relates to the articles chosen from devices for the production of hydrogen, self-cleaning windows and pollution-resistant walls comprising at least one ultraporous photocatalytic material as defined according to the invention.

In addition to the preceding provisions, the invention also comprises other provisions which will emerge from the additional description which follows, which relates to examples demonstrating the excellent properties of the photocatalytic materials of the invention, and also to the appended FIG. 1, which illustrates a device for the production of hydrogen comprising a layer of photocatalytic material according to the invention.

EXAMPLE

Example 1

A cell for the production of hydrogen, denoted (1) in FIG. 1, comprising two glass walls, denoted (2) and (2') in FIG. 1, was prepared. The cell (1) is divided into two compartments, separated from one another by the glass wall (2'). In this cell, the cathode, denoted (3) in FIG. 1 and situated between the glass walls (2) and (2'), is composed of a platinum wire dipped in the electrolyte (acidulated water), denoted (4) in FIG. 1. Thus, the compartment defined between the walls (2) and (2') is referred to as cathode compartment and the compartment defined between the wall (2') and the substrate, denoted (5) in FIG. 1, which acts as anode, is referred to as anode compartment.

A layer of composite material, precursor of the photocatalytic material, denoted (6) in FIG. 1, with a thickness of 3 µm, is deposited on the substrate (5), said substrate being in this instance a silicon wafer (diameter 100 mm, thickness 500 µm, resistivity in the range 10-20 Ω.cm), according to the following process:
  deposition of a mixture of aluminum (80 atom %) and titanium (20 atom %), produced by magnetron cathode sputtering of an aluminum target partially covered with titanium sheets, to form the composite material which is the precursor of the photocatalytic material (6), said deposition being carried out at a temperature of 100° C.,
  electrochemical anodization of the composite material in a 0.5 $mol.l^{-1}$ oxalic acid solution, under a current density of between 2 and 5 $mA.cm^{-2}$ (galvano-static conditions), up to a formation potential of 100-150 V. The current density is subsequently maintained for 30 to 40 minutes (potentiostatic conditions),
  removal of the aluminum oxide formed by selective chemical attack, by bringing into contact with a 2 $mol.l^{-1}$ phosphoric acid $H_3PO_4$ solution for from 1 to 2 minutes,
  rinsing with deionized water and drying the sample,
  thermal annealing of the composite material at a temperature of 650° C. for from 10 to 15 minutes.

A photocatalytic material (6) is obtained which exhibits the following properties:
  a pore size, measured by transmission microscopy, of 40-60 nm,
  a thickness of the walls of the pores, measured by transmission microscopy, of 4-8 nm,
  a porosity, measured by BET, of 70-80%, and
  a specific surface, determined by adsorption isotherm, of 600 $m^2.cm^{-3}$.

The cell (1) was subsequently irradiated under a light beam, denoted (7) in FIG. 1, of approximately 0.5*AM1.5 (AM1.5=standard corresponding to solar illumination), to produce hydrogen. A current density of 10 $mA.cm^{-2}$ and a voltage of 0.8 V are applied. Hydrogen is produced in the cathode compartment and oxygen is produced in the anode compartment. The amount of hydrogen produced is measured by measuring the variation in height of water present in a graduated measuring cylinder filled with water, the hydrogen being led into this measuring cylinder (not represented) via a tube, denoted (8) in FIG. 1, connected to the cathode compartment. The oxygen is discharged from the anode compartment via the tube denoted (9) in FIG. 1. 0.7 $cm^3$ of hydrogen per $cm^2$ is obtained in 30 minutes. This amount corresponds to a production of 28 l of hydrogen per hour and per square meter, that is to say to an energy efficiency of approximately 10%.

Example 2

A series of samples was produced by depositing by cathode sputtering on a titanium substrate, at a temperature of 300° C., a composite material comprising an atomic percentage of titanium of 50% and an atomic percentage of aluminum of 50%. The thickness of the film deposited is 1 µm.

Another series of samples was prepared by depositing by cathode sputtering, also on a titanium substrate, at a temperature of 100° C., a film having the same thickness (1 µm) of a composite material having the same composition as above.

The two series of samples were subsequently modified according to the same protocol, by undergoing:

a stage of electrochemical anodization in a dilute sulfuric acid $H_2SO_4$ solution (10% by volume, i.e. approximately 2 mol.l$^{-1}$), under a current density of 10 mA.cm$^{-2}$, then a stage of removal of the aluminum oxide $Al_2O_3$ formed by selective chemical attack, by bringing into contact with a dilute phosphoric acid $H_3PO_4$ solution (50% by volume, i.e. approximately 7 mol.l$^{-1}$), at a temperature of 50° C.

The two series of samples were subsequently respectively subjected to a thermal annealing at 500° C. and then a thermal annealing at 650° C., for a period of 20 minutes.

After the thermal annealing at 650° C., photocatalytic materials are obtained which exhibit the following properties:

for the 1st series:
  a thickness of the walls of the pores, measured by transmission microscopy, of 10-20 nm,
  a porosity, measured by BET, of 52-53%, and
  a specific surface, determined by adsorption isotherm, of 400 m$^2$.cm$^{-3}$, for the 2nd series:
  a thickness of the walls of the pores, measured by transmission microscopy, of 1-7 nm,
  a porosity, measured by BET, of 57-59%, and
  a specific surface, determined by adsorption isotherm, of 600 m$^2$.cm$^{-3}$.

The photocatalytic activity of the two series of samples was evaluated by measuring the photocurrent produced by a source of UV photons (approximately 15 mW.cm$^{-2}$). All the measurements were carried out at the zero displacement (without any external voltage source).

An increase in the photocatalytic efficiency of 100% is observed for the 2nd series of samples.

For the samples annealed at 500° C., the following current densities were measured:
  1st series: 10 μA.cm$^{-2}$,
  2nd series: 20 μA.cm$^{-2}$.

For the samples annealed at 650° C., the following current densities were measured:
  1st series: 12 μA.cm$^{-2}$,
  2nd series: 25 μA.cm$^{-2}$.

The annealing at a temperature of 650° C. thus increases the photocatalytic activity of the materials by 20%. This improvement is explained by better crystallization of the samples and by an increase in the anatase phase.

When the annealing is carried out at a temperature of 700° C., a detrimental change in the adhesion of the film (detachment of the layer) is observed.

Example 3

A series of samples was produced by depositing by cathode sputtering on a titanium substrate, at a temperature of 300° C., a composite material comprising an atomic percentage of titanium 50% and an atomic percentage of aluminum of 50%. The thickness of the film deposited is 1 μm.

Another series of samples was prepared by depositing by cathode sputtering, also on a titanium substrate, at a temperature of 100° C., a film having the same thickness (1 μm) of a composite material having the same composition as above.

The two series of samples were subsequently modified according to the same protocol by steeping in a solution comprising 150 ml of 100% acetic acid $CH_3COOH$, 30 ml of 65% nitric acid $HNO_3$, 760 ml of 80% phosphoric acid $H_3PO_4$ and 30 ml of water, the samples being kept in this solution for 15 minutes, at a temperature of 35° C.±5° C.

The two series of samples were subsequently respectively subjected to a thermal annealing at 500° C. and then a thermal annealing at 650° C., under an oxidizing atmosphere at atmospheric pressure, for a period of 30 minutes. For the samples annealed at 500° C., the following current densities were measured:
  1st series: 9 μA.cm$^{-2}$,
  2nd series: 19 μA.cm$^{-2}$.

For the samples annealed at 650° C., the following current densities were measured:
  1st series: 11 μA.cm$^{-2}$,
  2nd series: 24 μA.cm$^{-2}$.

The annealing at a temperature of 650° C. thus increases the photocatalytic activity of the samples by 20%.

The invention claimed is:

1. A process for the manufacture of an ultraporous photocatalytic material comprising:
  a stage of deposition on a substrate, at a temperature of between 50 and 250° C., of a composite material composed of at least one refractory metal and of at least one nonrefractory filler metal,
  a subsequent stage of removal of the nonrefractory filler metal, said process also comprising a final stage of thermal annealing at a temperature greater than or equal to 600° C., and also an oxidation stage which can be carried out either before or after the stage of removal of the nonrefractory filler metal or simultaneously with the final stage of thermal annealing.

2. The process as claimed in claim 1, comprising the following stages:
  (i) a deposition on a substrate, at a temperature of between 50 and 250° C., of a composite material composed of at least one refractory metal and of at least one nonrefractory filler metal,
  (ii) an oxidation of the composite material,
  (iii) a removal by selective chemical attack of the nonrefractory filler metal oxide obtained during stage (ii),
  (iv) a thermal annealing at a temperature greater than or equal to 600° C.

3. The process as claimed in claim 1, comprising the following stages:
  (i') a deposition on a substrate, at a temperature of between 50 and 250° C., of a composite material composed of at least one refractory metal and of at least one nonrefractory filler metal,
  (ii') a removal by selective chemical attack of the nonrefractory filler metal obtained during stage (i'),
  (iii') an oxidizing chemical treatment or a heat treatment under an oxidizing atmosphere,
  (iv') a thermal annealing at a temperature greater than or equal to 600° C.

4. The process as claimed in claim 1, comprising the following stages:
  (i") a deposition on a substrate, at a temperature of between 50 and 250° C., of a composite material composed of at least one refractory metal and at least one nonrefractory filler metal,
  (ii") a removal by selective chemical attack of the nonrefractory filler metal obtained during stage (i"),
  (iv") a thermal annealing under an oxidizing atmosphere, at a temperature greater than or equal to 600° C.

5. The process as claimed in claim 1 wherein the stage of deposition of the composite material is carried out at a temperature of between 50 and 150° C. by cathode sputtering, thermal evaporation or electrolytic deposition.

6. The process as claimed in claim 1 wherein the refractory metal is chosen from titanium, tungsten, niobium, molybdenum and their mixtures and the nonrefractory filler metal is chosen from aluminum, silicon or their mixture.

7. The process as claimed in claim 6, wherein that the refractory metal is chosen from titanium or the titanium/tungsten mixture, and the nonrefractory filler metal is aluminum.

8. The process as claimed in claim 1 wherein the atomic percentage of refractory metal in the composite material is between 20 and 70%.

9. The process as claimed in claim 1 wherein the substrate is chosen from glass, metal, polymers, ceramics and semiconducting materials.

10. The process as claimed in claim 1 wherein the stage of removal by selective chemical attack consists in bringing the substrate, covered with the composite material, into contact with an acidic or basic solution preferably chosen from solutions of phosphoric acid ($H_3PO_4$), sodium carbonate ($NaCO_3$), potassium hydroxide (KOH) and sodium hydroxide (NaOH).

11. The process as claimed in claim 1 wherein the oxidation stage is a thermal, chemical or electrochemical oxidation stage.

12. The process as claimed in claim 2, wherein the oxidation stage (ii) is an electrochemical oxidation stage carried out by dipping the composite material in an acidic aqueous solution having a concentration of between 0.1 and 3 $mol.l^{-1}$, at a temperature of between 40 and 70° C., and by then applying a current density of between 1 and 15 $mA.cm^{-2}$ until a potential of between 70 and 250 V is achieved.

13. The process as claimed in claim 3, wherein the stage (iii') of oxidizing chemical treatment or heat treatment under an oxidizing atmosphere is:
  either a stage of chemical oxidation carried out in an oxidizing bath based on $H_2SO_4/H_2O_2$ or $HCl/H_2O_2$,
  or a stage of thermal oxidation carried out at a temperature of between 400 and 500° C., the temperature of stage (iii') having to be lower than the temperature of the stage (iv') of thermal annealing, by introduction of molecular oxygen $O_2$ at a pressure between 100 mbar and 1 bar.

14. The process as claimed in claim 4, wherein the stage (iv'') of thermal annealing under an oxidizing atmosphere is carried out by introduction of molecular oxygen $O_2$ at atmospheric pressure.

15. An ultraporous photocatalytic material comprising at least one refractory metal oxide including pores for which the walls comprise the at least one refractory metal oxide and have a thickness of less than or equal to 10 nm, and exhibiting a specific surface of between 500 and 700 $m^2.cm^{-3}$.

16. The ultraporous photocatalytic material as claimed in claim 15, wherein the walls of the pores have a thickness of between 1 and 7 nm.

17. The ultraporous photocatalytic material as claimed in claim 15 wherein the refractory metal oxide is chosen from titanium oxide, tungsten oxide, niobium oxide, molybdenum oxide and their mixtures.

18. The ultraporous photocatalytic material as claimed in claim 15 wherein the material exhibits a porosity of between 50 and 95%.

19. The ultraporous photocatalytic material as claimed in claim 15 wherein the material exhibits a specific surface of between 600 and 700 $m^2.cm^{-3}$.

20. The ultraporous photocatalytic material as claimed in claim 15 the material exhibits a thickness of greater than 2 µm.

21. An article chosen from devices for the production of hydrogen, self-cleaning windows and pollution-resistant walls, wherein the article comprises at least one ultraporous photocatalytic material as defined according to claim 15.

* * * * *